United States Patent
Yaoya et al.

[11] Patent Number: 5,937,045
[45] Date of Patent: Aug. 10, 1999

[54] TELEPHONE CALL FEE NOTIFYING SYSTEM AND TELEPHONE CALL FEE NOTIFYING APPARATUS

[75] Inventors: Naoko Yaoya; Hiroshi Sato; Mariko Mori; Saburou Ikeda; Takemasa Takahashi; Hiromi Atsuta; Chizuko Yoshida; Masatoshi Mizobe, all of Tokyo, Japan

[73] Assignee: NEC Corporation, Tokyo, Japan

[21] Appl. No.: 08/616,615

[22] Filed: Mar. 15, 1996

[30] Foreign Application Priority Data

Mar. 17, 1995 [JP] Japan .................................... 7-058675

[51] Int. Cl.$^6$ ................................................. H04M 15/00
[52] U.S. Cl. ............................................. 379/130; 379/133
[58] Field of Search .................................. 379/67, 80, 88, 379/112, 114, 130, 133, 142, 121

[56] References Cited

U.S. PATENT DOCUMENTS

| | | | |
|---|---|---|---|
| 4,751,728 | 6/1988 | Treat | 379/114 |
| 4,879,742 | 11/1989 | Taniguchi | 379/130 |
| 5,003,584 | 3/1991 | Benyacar et al. | 379/121 |
| 5,265,145 | 11/1993 | Lim | 379/188 |
| 5,289,530 | 2/1994 | Reese | 379/142 |
| 5,303,297 | 4/1994 | Hillis | 379/133 |
| 5,349,638 | 9/1994 | Pitroda | 379/142 |
| 5,425,083 | 6/1995 | Furuya | 379/114 |
| 5,430,794 | 7/1995 | Ayame | 379/112 |
| 5,550,915 | 8/1996 | Partridge, III | 379/112 |

FOREIGN PATENT DOCUMENTS

| | | |
|---|---|---|
| 49-119506 | 11/1974 | Japan . |
| 148953 | 6/1990 | Japan . |
| 4-54057 | 2/1992 | Japan . |
| 4-160971 | 6/1992 | Japan . |
| 63826 | 3/1993 | Japan . |
| 5-191343 | 7/1993 | Japan . |
| 236128 | 9/1993 | Japan . |

*Primary Examiner*—Vijay Shankar
*Attorney, Agent, or Firm*—Sughrue, Mion, Zinn, Macpeak & Seas, PLLC

[57] ABSTRACT

Telephone call fee notifying system and apparatus for informing a calling subscriber of a fee for telephoning a destination before talking starts. When the calling subscriber dials a special number, this special number is recognized by a charging information request recognizing unit, a telephone call fee for a connection destination is calculated in response to subsequently transmitted dialing by means of a charging calculation unit and a calculated telephone call fee is informed to the calling subscriber in the form of a speech by means of a charging information speech outputting unit. Listening to the speech, the calling subscriber decides whether a circuit connection is to be done or not and when the circuit connection is determined, an operation therefor is carried out to establish a connection to the desired connection destination.

6 Claims, 2 Drawing Sheets

5,937,045

TELEPHONE CALL FEE NOTIFYING SYSTEM AND TELEPHONE CALL FEE NOTIFYING APPARATUS

BACKGROUND OF THE INVENTION

The present invention relates to telephone call fee notifying system and an apparatus in an exchange system including a mobile terminal such as a personal handyphone.

The conventional charging system can be classified into major two types of which one asks only a calling (originating) subscriber for payment of a telephone call fee and the other asks a called (terminating) subscriber to pay a telephone call fee. JP-A-4-54057 discloses a system in which a called subscriber can freely change the charging index. In this system, when a control signal for changing the charging index is transmitted from the called subscriber following completion of talking, a telephone call fee which has been charged on a calling subscriber is so changed as to be charged on the called subscriber or vice versa, thus making it possible to select a charging system meeting a request of the called subscriber.

With the conventional systems, however, charging of a telephone call fee is controlled from only the called subscriber and the contents or amount of charging can be known only by the called subscriber. Accordingly, in spite of the fact that a telephone call fee may be extraordinarily higher for, for example, mobile terminal communications than for the ordinary wire telephone, this fact may be forgotten by the caller and talking is done as if an ordinary wire telephone is used, with the result that an unexpectedly high telephone call fee is charged later on. But means for knowing the telephone call fee is not provided on the calling subscriber side and therefore it is not possible for the calling subscriber to decide to make the call by taking the telephone call fee into account even when an urgent communication is desired.

SUMMARY OF THE INVENTION

The present invention contemplates elimination of the above problems and intends to provide telephone call fee notifying system and an apparatus which can detect a number dialed by a calling subscriber and not interfering with a number network plan, calculate a telephone call fee for calling a destination, and inform the calling subscriber of the telephone call fee in the form of a speech message.

In the system and apparatus according to the present invention, when a calling subscriber dials a special number, this number is recognized to prepare for telephone call fee notification, a telephone call fee for a connection destination is calculated in response to a subsequently dialed number, and the telephone call fee is provided to the calling subscriber in the form of a speech message. The calling subscriber listening to the speech message concerning the fee can then decide whether the circuit is to be connected or disconnected, and when the circuit is to be connected, an operation therefor is carried out to establish a connection to a desired connection destination.

DESCRIPTION OF THE PREFERRED EMBODIMENTS

Figure 1:
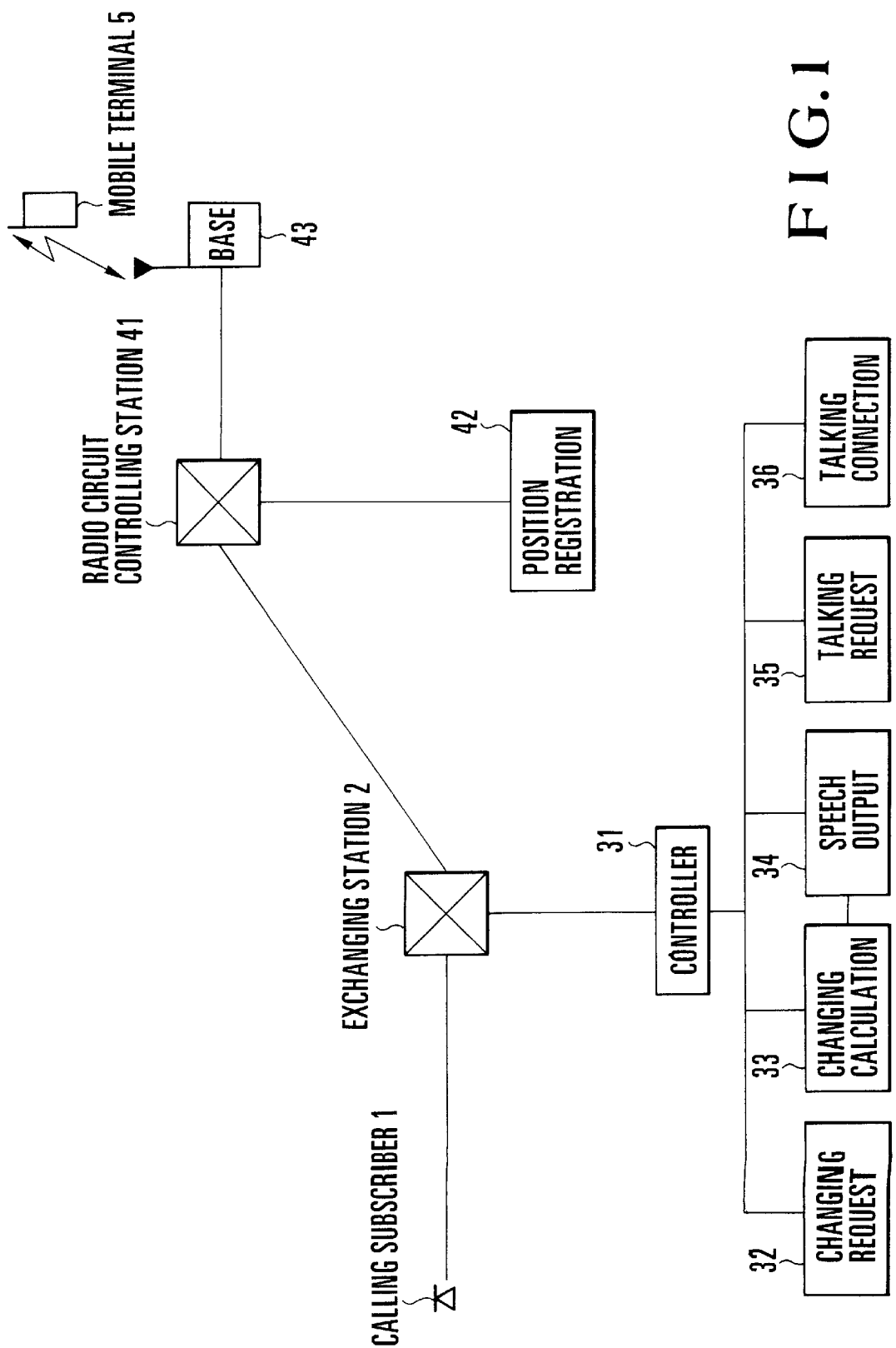
FIG. 1 is a block diagram showing the construction of an embodiment of the present invention.

Referring now to FIG. 1, there is illustrated in block form an embodiment of the present invention. Exemplarily, in this embodiment, transmission is effected from a calling subscriber 1 to a mobile communication terminal 5. A exchanging station 2 serves as an interface to the calling subscriber 1 and a controller 31 controls a charging information recognizing unit 32, a charging calculation unit 33, a charging information speech outputting unit 34, a talking request recognizing unit 35 and a talking connection executing unit 36 so as to interface with the exchanging station 2.

Figure 2:
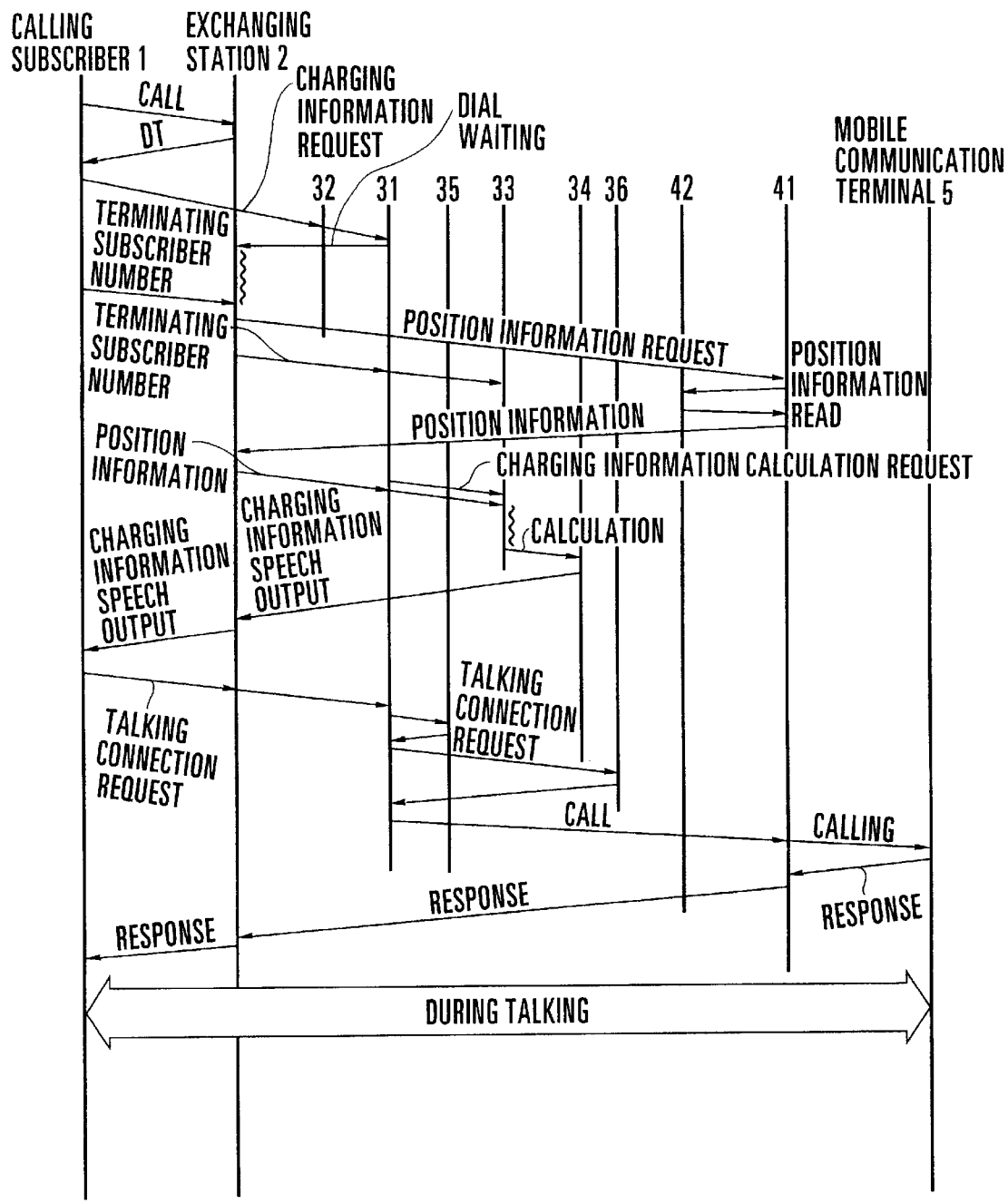
FIG. 2 is a diagram showing the outline sequence of processing in the FIG. 1 system.

The mobile communication terminal 5 lies within an area controllable by a base station 43 of a radio circuit controlling station 41, and position registration information of the mobile communication terminal 5 is constantly registered in a position registering unit 42. The exchanging station 2 and the radio circuit controlling station 41 are connected to each other through a wire or radio transmission path. When the calling subscriber 1 transmits a charging information request in a system constructed as above, a charging information confirmable connection is carried out in which the calling subscriber 1 is informed of charging information in the form of a speech message on the basis of an originated dial number and talking is executed in accordance with a talking connection request from the calling subscriber 1, as will be described below with reference to FIGS. 1 and 2. As shown in FIG. 2, when the calling subscriber 1 first calls, the exchanging station 2 transmits a dial tone (DT) to the calling subscriber 1. Then, if the calling subscriber 1 does not transmits a charging information request, the controller 31 issues a talking connection request to the talking connection executing unit 36 and ordinary talking is executed. But if the calling subscriber 1 issues a charging information request by dialing, for example, a predetermined number which is not problematic from the standpoint of a domestic network number plan, the charging information request recognizing unit 32 determines the predetermined number representing a charging information request as not an ordinary dial number but a request for charging information and the controller 31 places the exchanging station 2 in dial waiting condition.

Receiving a dial number from the calling subscriber 1, the exchanging station recognizes that the dial number corresponds to the mobile communication terminal and transmits a position information request of the mobile communication terminal 5 to the radio circuit controlling station 41. As a result, position information of the mobile communication terminal 5 is sent from the position registering unit 42 to the exchanging station 2 through the radio circuit controlling station 41.

Since the calling subscriber 1 is requesting the telephone charging information, the controller 31 issues to the charging calculation unit 33 a request which commands it to calculate present charging information. Based on the dialed telephone number of mobile terminal and the position information of the destined mobile communication terminal 5, the charging calculation unit 33 calculates the current charging information, for example, a talking time per message rate.

The thus calculated charging information is delivered to the charging information speech outputting unit 34 and a speech message based on the charging information is transmitted to the calling subscriber 1 through the exchanging station 2. For example, the calling subscriber 1 is informed of "You can talk for 7 seconds at one message rate costing 10¢." In the presence of a signaling "beep" before the informing message, the calling subscriber can confirm the arrival of a charging information message.

Before receiving the talking request from the calling subscriber 1, the exchanging station 2 and the radio circuit controlling station 41 serving as a terminating station are placed in a talking waiting condition and do not call the mobile communication terminal 5 yet. After confirming the charging information and thereafter determining that talking under that charging condition is acceptable, the calling subscriber 1 transmits the talking connection request to the exchanging station 2.

The transmission of the talking connection request can be effected by a method which is recognizable by the talking request recognizing unit 35, for example, by dialing the predetermined number which is not problematic from the standpoint of a domestic network number plan or by hooking. When the talking request recognizing unit 35 recognizes the presence of the talking request and urges the controller 31 to perform talking, the controller 31 sends the talking connection request to the talking connection executing unit 36, so that the mobile communication terminal 5 is called and ordinary talking is executed.

In the foregoing embodiment, the mobile communication terminal is described as being a terminating subscriber but the present invention is in no way limited thereto.

As described above, according to the present invention, when the calling subscriber requests charging information, the calling subscriber can be informed of charging information for calling a mobile communication terminal or other terminating subscriber in the form of a speech message on the basis of an originated dial number, so that the calling subscriber can talk after recognizing a telephone call fee and can prevent an abnormally high telephone call fee when it is charged. Since it can be decided whether talking is to be done before talking is started, it is possible to decide whether an urgent message to, for example, a mobile terminal is to be communicated immediately or can wait to be communicated through a wire telephone after arrival of the mobile terminal at a destination.

What is claimed is:

1. A telephone call fee notifying system comprising:

means for calculating a telephone call fee for a destination to which a calling subscriber desires to connect in response to said calling subscriber dialing a predetermined telephone number which represents a request for charging information; and means for informing said calling subscriber of a calculated telephone call fee in the form of a speech message.

2. A telephone call fee notifying system according to claim 1, wherein said predetermined telephone number is a number that does not interfere with a telephone number in the network plan.

3. A telephone call fee notifying apparatus in an exchange system comprising:

charging information request recognizing means for recognizing a predetermined telephone number representing that a charging information request is transmitted from a calling subscriber to said exchange system;

charging calculation means for calculating charging information on the basis of an originated dial number when a charging information request is transmitted from said calling subscriber to said exchange system;

charging information speech outputting means for informing said calling subscriber of the charging information in the form of a speech message when the charging information request is transmitted from said calling subscriber to said exchange system;

talking request recognizing means for recognizing a talking request from said calling subscriber to said exchange system; and talking connection executing means for executing a talking connection to a called subscriber only when said calling subscriber issues a talking request to said exchange system, whereby when the charging information request is transmitted from said calling subscriber, the charging information is provided to said calling subscriber in the form of a speech message on the basis of the originated dial number and if said calling subscriber confirms the charging information and issues the talking request, then the talking connection to said called subscriber is executed.

4. The apparatus according to claim 3, wherein the predetermined telephone number is a number that does not interfere with a telephone number network plan.

5. A telephone call fee notifying method comprising:

(a) calculating a telephone call fee for a destination to which a calling subscriber desires to connect in response to said calling subscriber dialing a predetermined telephone number which represents a request for charging information; and (b) informing said calling subscriber of a calculated telephone call fee in the form of a speech message.

6. A telephone call fee notifying method as claimed in claim 5, wherein said step (a) further comprises calculating a telephone call fee for a destination to which a calling subscriber desires to connect in response to said calling subscriber dialing a telephone of said destination to which the calling subscriber desires to connect and then dialing a predetermined telephone number which represents a request for charging information.

* * * * *